US011633808B2

(12) United States Patent
Zhao et al.

(10) Patent No.: US 11,633,808 B2
(45) Date of Patent: Apr. 25, 2023

(54) SILICON STEEL PRODUCT WITH LOW IRON LOSS FOR LOW-NOISE TRANSFORMER, AND MANUFACTURING METHOD THEREOF (71) Applicant: BAOSHAN IRON & STEEL CO., LTD., Shanghai (CN)

(72) Inventors: Zipeng Zhao, Shanghai (CN); Changjun Hou, Shanghai (CN); Banglin Xiang, Shanghai (CN); Kanyi Shen, Shanghai (CN); Guobao Li, Shanghai (CN); Chen Ling, Shanghai (CN); Weiyong Xie, Shanghai (CN); Yanli Song, Shanghai (CN)

(73) Assignee: BAOSHAN IRON & STEEL CO., LTD., Shanghai (CN)

( * ) Notice: Subject to any disclaimer, the term of this patent is extended or adjusted under 35 U.S.C. 154(b) by 435 days.

(21) Appl. No.: 16/336,095

(22) PCT Filed: Jun. 13, 2017

(86) PCT No.: PCT/CN2017/088090
§ 371 (c)(1),
(2) Date: Mar. 22, 2019

(87) PCT Pub. No.: WO2018/059006
PCT Pub. Date: Apr. 5, 2018

(65) Prior Publication Data
US 2019/0255657 A1 Aug. 22, 2019

(30) Foreign Application Priority Data
Sep. 29, 2016 (CN) .................. 201610872843.X (51) Int. Cl.
*B23K 26/361* (2014.01)
*C21D 8/12* (2006.01)
(Continued)

(52) U.S. Cl.
CPC .............. *B23K 26/361* (2015.10); *C21D 8/12* (2013.01); *C21D 8/1222* (2013.01);
(Continued)

(58) Field of Classification Search
CPC ...... B23K 26/361; C21D 8/12; C21D 8/1222; C21D 8/1233; C21D 8/1244;
(Continued)

(56) References Cited

U.S. PATENT DOCUMENTS 3,644,185 A * 2/1972 Benford ............... C21D 8/1277
148/111
2015/0007908 A1* 1/2015 Watanabe ............. C22C 38/16
148/111
(Continued)

FOREIGN PATENT DOCUMENTS

CN 101638766 A 2/2010
CN 103572157 A 2/2014
(Continued)

OTHER PUBLICATIONS

CN103572157A—Espacenet English machine translation (Year: 2014).*
(Continued)

*Primary Examiner* — Keith Walker
*Assistant Examiner* — Adil A. Siddiqui
(74) *Attorney, Agent, or Firm* — Flener IP & Business Law; Zareefa B. Flener (57) ABSTRACT

An oriented silicon steel product with a low iron loss for a low-noise transformer, and manufacturing method thereof are provided. The oriented silicon steel product comprises: a silicon steel substrate, a magnesium silicate bottom layer formed on a surface of the silicon steel substrate, and an insulation coating applied on the magnesium silicate bottom layer. The magnesium silicate bottom layer has a visible
(Continued)

light normal reflectivity (R) of 40-60% for. By strictly controlling the visible light normal reflectivity of the magnesium silicate bottom layer of the silicon steel substrate and the evenness of the gloss of magnesium silicate bottom layer, lower iron loss, and reduced magnetostriction can be achieved, and thus a silicon steel product with low noise and particularly suitable for transformers can be obtained.

12 Claims, 3 Drawing Sheets

(51) Int. Cl.
| | |
|---|---|
| *C22C 38/02* | (2006.01) |
| *H01F 27/245* | (2006.01) |
| *C22C 38/04* | (2006.01) |
| *C22C 38/06* | (2006.01) |
| *C22C 38/12* | (2006.01) |
| *C22C 38/16* | (2006.01) |

(52) U.S. Cl.
CPC ............ *C21D 8/1233* (2013.01); *C22C 38/02* (2013.01); *H01F 27/245* (2013.01); *C22C 38/04* (2013.01); *C22C 38/06* (2013.01); *C22C 38/12* (2013.01); *C22C 38/16* (2013.01)

(58) Field of Classification Search
CPC ....... C21D 8/1283; C22C 38/02; C22C 38/04; C22C 38/06; C22C 38/12; C22C 38/16; C22C 38/001; C22C 38/008; C22C 38/00; H01F 27/245; H01F 1/16
See application file for complete search history.

(56) References Cited

U.S. PATENT DOCUMENTS

| | | | |
|---|---|---|---|
| 2015/0255211 A1* | 9/2015 | Shen ................... | H01F 1/14783 148/111 |
| 2021/0174985 A1* | 6/2021 | Kwon ................... | C21D 8/1283 |

FOREIGN PATENT DOCUMENTS

| | | | | |
|---|---|---|---|---|
| CN | 103572157 | A | * | 2/2014 |
| CN | 103805918 | A | | 5/2014 |
| JP | H09291313 | A | | 11/1997 |
| JP | 2009270129 | A | | 11/2009 |
| JP | 2011099155 | A | | 5/2011 |
| JP | 2011099155 | A | * | 5/2011 ............. C23C 22/74 |
| JP | 2011246770 | A | * | 12/2011 |
| JP | 2011246770 | A | | 12/2011 |
| JP | 2015129726 | A | | 7/2015 |
| JP | WO2018003817 | A1 | | 5/2019 |
| KR | 20150074860 | A | | 7/2015 |
| RU | 2552562 | C2 | | 6/2015 |
| RU | 2594543 | C1 | | 8/2016 |
| RU | 2597190 | C1 | | 9/2016 |
| WO | 2014157713 | A1 | | 10/2014 |

OTHER PUBLICATIONS

European Patent Office, 80298 Munich, Germany, Date: Apr. 7, 2020, Reference: B16188WOEP/HLZ, Application No./Patent No. 17854461.5-1103/3521378 PCT/CN2017088090, Applicant/Proprietor: Baoshan Iron & Steel Co., Ltd., Communication, Extended European Search Report.
(Translation of the Office Action) Ref. No.:, Mail No. 188335 dated May 26, 2020, Notice of Reasons for Refusal Application No.: Japanese Patent Application No. 515996/2019, dated May 19, 2020, 3239 4E00, Applicant's representative: Mr. Hajime Takashima (and 6 others) Applied Article(s) of the Patent Act: 36.
Intellectual Property India, Patent Office, Examination Report, App. No 201917011721, Applicant: Baoshan Iron & Steel Co., Ltd., dated Jan. 29, 2021.
Innovation, Science and Economic Development Canada, Canadian Intellectual Property Office, Millman IP Inc., 2108-401 Bay Street, Box 60, Toronto Ontario, M5H 2Y4, Apr. 27, 2020, Application No. 3,036,289, PCT No. CN2017088090, Owner: Baoshan Iron & Steel Co., Ltd., Title: Oriented Silicon Steel Product With Low Iron Loss for Low-Noise Transformer, and Manufacturing Method Thereof, Classification: C23C 30/00 (Jan. 2006), First Office Action.
Innovation, Science and Economic Development Canada, Canadian Intellectual Property Office, Millman IP Inc., 2108-401 Bay Street, Box 60, Toronto Ontario M5H 2Y4, Nov. 5, 2020, Application No. 3,036,289, PCT No. CN2017088090, Owner: Baoshan Iron & Steel Co., Ltd., Title: Oriented Silicon Steel Product With Low Iron Loss for Low-Noise Transformer, and Manufacturing Method Thereof, Classification: C23C 30/00 (Jan. 2006), Second Office Action.
(Translation of the Office Action), Ref. No.:, Mail No. 493449, dated Dec. 1, 2020, Notice of Reasons for Refusal, Application No.: Japanese Patent Application No. 515996/2019, dated Nov. 26, 2020, 3239 4E00, Applicant's representative: Mr. Hajime Takashima (and 6 others), Applied Article(s) of the Patent Act: 36.
[English translation], Notification No. 9-5-2020-061342149, Transmission Date: Sep. 4, 2020, Addressed to: IPS Intellectual Property Law Firm, Deadline to Reply: Nov. 4, 2020, Korean Intellectual Property Office, Notice of Office Action, Applicant(s): Name: Baoshan Iron & Steel Co., Ltd., Agent: Name IPS Intellectual Property Law Firm.
Chinese First Office Action, 200021, 201610872843.X, 2018121701782580.
Chinese Second Office Action, 200021, 201610872843.X, 2019070901906620.
Patent Office of the Russian Federation, Federal Institute of Industrial Property, To: Nevinpat, P.O.Box 24, St. Petersburg 191036, Your ref. 9-P17981RU of, Our ref. 2019107284/02(013957), When sending correspondence, please refer to the application number and report the date of receipt of the present correspondence, of Dec. 30, 2019, Office Action (Enquiry), (21) Application No. 2019107284/02(013957).
Form No. 01 IZ-2014, Patent Office of the Russian Federation, (ROSPATENT), 30-1, Berezhkovskaya nab. 125993, Moscow, G-59, GSP-3, Phone (8-499) 240-60-15, fax (8-495) 531-63-18, Your ref. 9-P17981RU of Mar. 24, 2020, To: Nevinpat, P.O.Box 24, St. Petersburg 191036, Our ref. 2019107284/02, When sending correspondence, please refer to the application number and report the date of receipt of the present correspondence of Apr. 2, 2020, Decision to Grant a Patent for an Invention, (21) Application No. 2019107284/02, (22) Filing date: Jun. 13, 2017.
Office Action from Brazil for BR112019005572-0, national stage entry of PCT/CN2017/088090—dated Jun. 8, 2021.

* cited by examiner

SILICON STEEL PRODUCT WITH LOW IRON LOSS FOR LOW-NOISE TRANSFORMER, AND MANUFACTURING METHOD THEREOF

TECHNICAL FIELD

The invention relates to a steel product and a manufacturing method thereof, in particular to a silicon steel product and a manufacturing method thereof.

BACKGROUND ART

In recent years, global energy and environmental issues have become increasingly prominent, threatening the sustainable development of humanity. As a result, the demand for energy conservation and consumption reduction is increasing worldwide. Countries have generally raised the standard of energy-consuming equipment to reduce the active loss of various types of equipment. In power transmission systems, transformer losses account for about 40% of the total loss. The iron core made of oriented silicon steel is the core component of a transformer, and the core loss accounts for about 20% of the total loss. Iron core loss is often referred to as iron loss. Therefore, reducing the iron loss of oriented silicon steel has great economic and social benefits.

In addition, the noise pollution of urban substation equipment is gradually drawing attention. Studies have shown that transformer noise is derived from the magnetostriction, electromagnetic force and mechanical vibration, and the like of silicon steel sheets. Among them, magnetostriction is one of the basic sources of transformer noise. On the one hand, magnetostriction causes the silicon steel sheet to vibrate under an alternating electromagnetic field periodically and generate noise. On the other hand, the vibration of the silicon steel sheet causes resonance with the additional devices of the transformer such as a water tank, a cooling device, an oil receiver, etc. and generates noise.

Therefore, reducing the iron loss and the magnetostriction of an oriented silicon steel sheet is an important direction in the development of oriented silicon steel and also a main difficulty in further development of current oriented silicon steel products and technologies.

In the prior art, manufacturing methods for silicon steel sheets can be mainly divided into high temperature processing, medium temperature processing, and low temperature processing, according to the heating temperature of the slab. Typically, in a high temperature process, a slab needs to be heated to a maximum of 1400° C. to fully solutionize the inhibitor. However, such high heating temperature has reached the limit of conventional furnaces. Moreover, the high heating temperature leads to severe burning loss, so the heating furnace needs to be frequently repaired and thus the utilization rate thereof is low. In addition, the energy consumption is high, and the edge crack of the hot-rolled coil is large, resulting in difficulty in cold rolling, low yield, and relatively high cost. In a medium temperature process, the heating temperature of a slab is 1250° C.~1320° C., and AlN and Cu are used as inhibitors. In a low temperature process, the heating temperature of a slab is 1100° C.~1250° C., and the inhibition ability is mainly obtained by an inhibitor formed from nitriding after decarburization. However, the disadvantages of the low temperature process are as follows: the morphology of the inhibitor is difficult to control, resulting in difficulty in obtaining stable magnetic properties and bottom layer quality.

In the prior art, methods for obtaining a low iron loss silicon steel sheet mainly comprises: 1) increasing the content of Si; 2) adding an alloying element such as Sn and Sb to enhance the inhibitory ability of an inhibitor; 3) using rapid heating in a heating stage of the decarburization annealing process. However, regarding 1), since Si is a non-conductive element, the increase of Si content increases the resistivity of the silicon steel sheet and reduces the eddy current loss of the silicon steel sheet, but also greatly increases the amount of $SiO_2$ formed in the surface oxide film during the decarburization annealing process. Regarding 2), both Sn and Sb are elements that are easily segregated, therefore the addition of Sn and Sb reduces the interfacial energy of the precipitate, thereby inhibiting the Ostwald growing of the precipitate and maintaining the strong inhibitory ability of the inhibitor. However, alloying elements such as Sn and Sb are easily enriched in the surface during decarburization annealing, and thus inhibits the diffusion and reaction of O and Si elements on the near surface, and causes some changes in the composition and structure of the oxide film (mainly $Fe_2SiO_4$, FeO, and $SiO_2$) formed during the decarburization annealing process. Moreover, regarding 3), the rapid heating technique in the decarburization annealing process can increase the energy storage required for recrystallization, make the primary grains uniform, and increase the quantity of surface secondary nuclei and prevent the grains in other orientations from growing up, so that the size of the secondary grains is reduced and the iron loss of the silicon steel sheet is reduced. However, 3) has the following drawback: the extremely short heating time greatly shortens the formation time of an oxide film, resulting in a change in the proportion of the oxide film components.

It can be seen that the above techniques for reducing iron loss result changes in the oxide film of the decarburization annealed sheet in different degrees, so that the bottom layer of a finished product tend to have defects such as a too thin bottom layer and bright spots. The unevenness and defects of the bottom layer cause the energy distribution inside the crystal uneven, near the defect, the quantity of 90° domains increases; and the magnetostriction of an oriented silicon steel sheet increases, which increases the vibration noise of the manufactured transformer. Moreover, in the subsequent process for further reducing the iron loss by laser scribing, the unevenness and defects of the bottom layer significantly affect the absorption of the laser energy of the substrate, and thus causes uneven performances of the final product.

A Japanese non-patent literature published by Journal of Magnetics Society of Japan Vol. 22, No. 4-1, 1998 titled "Domain Structures and Magnetostriction in Grain-Oriented Electrical Steels" considers that the magnetostriction of a silicon steel sheet is generated by the magnetic pole rotation of the 90° magnetic domain inside the material during the magnetization process, and methods of reducing the magnetostriction of a silicon steel sheet by reducing the 90° magnetic domain are as follows: increasing the degree of orientation, increasing the tension of coating, reducing the residual stress, maintaining the flatness of steel sheet, and thinning the steel sheet. The current method for increasing the degree of orientation is the aforementioned metallurgical method. In recent years, misorientation angle of the secondary recrystallized grains with the Goss orientation has been reduced to 5° or less, which is close to the theoretical limit. However, the difficulties in using a tension coating to reduce the magnetostriction of a silicon steel sheet are as follows: on the one hand, the conventional phosphate tension coating is limited by the thermal expansion coefficient of its composition system, and the room for improvement of tension is not large. Therefore, in order to further increase the tension, it is necessary to increase the thickness of the coating. However, an increase in coating thickness will cause the stacking factor of a silicon steel sheet to decrease. On the other hand, high-tension coating technologies using physical vapor deposition (PVD) and chemical vapor deposition (CVD) technologies are costly and technically difficult to industrialize.

Moreover, in the prior art, the method for smoothing the magnetostriction waveform by laser scribing requires strict control of the change of the magnetostriction after coating and laser scribing. In the actual production process, such a method increases the step of measuring magnetostriction and therefore complicates the process and increases cost relatively.

The above techniques only considered the use of metallurgy and subsequent coating and scribing processes to reduce the iron loss and the magnetostriction of a silicon steel sheet. However, the influences of the bottom layer on the magnetostriction of a silicon steel substrate, and methods for reducing the magnetostriction of a silicon steel sheet by a combination of the bottom layer and the subsequent scribing process are not discussed.

SUMMARY OF THE INVENTION

One of the objects of the present invention is to provide an oriented silicon steel product with low iron loss for a low-noise transformer. By strictly controlling the visible light normal reflectivity of the magnesium silicate bottom layer of the silicon steel substrate and the evenness of the gloss of the magnesium silicate bottom layer, the iron loss and the magnetostriction are reduced, and the obtained silicon steel product has low noise and is particularly suitable for transformers.

Based on the above objects, the present invention provides an oriented silicon steel product with low iron loss for a low-noise transformer, comprising: a silicon steel substrate, a magnesium silicate bottom layer formed on the surface of the silicon steel substrate, and an insulation coating applied on the magnesium silicate bottom layer. The magnesium silicate bottom layer has a visible light normal reflectivity R of 40-60%.

After high temperature annealing, the oxide film formed on the surface of the silicon steel substrate during the decarburization annealing stage reacts with MgO in the annealing separator to form a magnesium silicate bottom layer. Because the magnesium silicate bottom layer has different thermal expansion coefficient with the steel, it provides tension to the silicon steel substrate to some extent. In addition, because the magnesium silicate bottom layer has different absorbance and refractive index with the steel, the original metallic luster of the surface of the silicon steel substrate is replaced by a dark gray luster. The inventors of the present invention have found through thorough research that, the magnetostriction of a silicon steel substrate is extremely sensitive to internal stress and unevenness or defects of the magnesium silicate bottom layer. This is because a large number of 90° domains are easily generated by the internal stress, and also easily generated in the vicinity of the uneven regions or defects of the magnesium silicate bottom layer. Furthermore, the unevenness or defects of the magnesium silicate bottom layer make the absorption of the laser energy of the bottom layer to be greatly different, which affects the subsequent process of the silicon steel sheet.

Based on the above findings, the inventors of the present invention achieved an effective reduction in iron loss and magnetostriction by controlling the luster of the magnesium silicate bottom layer of the silicon steel substrate. The luster of the magnesium silicate bottom layer of the silicon steel substrate can be evaluated by its visible light normal reflectivity R. The inventors of the present invention have found through a large number of experiments that the visible light normal reflectivity R is related to the thickness of the magnesium silicate bottom layer, the near surface segregation of Sn and Al element, the pinning structure of the bottom layer, and the surface roughness. These are the key factors affecting the tension of the magnesium silicate bottom layer and the hindrance to the movement of the magnetic domain walls.

When the visible light normal reflectivity R is 40-60%, the iron loss is significantly lowered. When the visible light normal reflectivity R is less than 40%, the magnesium silicate bottom layer is too thick, and the pinning effect for movement of the magnetic domain wall significantly increases, which increases the iron loss and reduces the magnetic induction. When the visible light normal reflectivity R is higher than 60%, the magnesium silicate bottom layer is too thin to apply an effective tension on the silicon steel substrate, and reduce the iron loss. Therefore, in the technical solutions of the present invention, the visible light normal reflectivity R of the magnesium silicate bottom layer is controlled to 40-60%.

In order to achieve a better implementation effect, preferably, in the oriented silicon steel product with low iron loss for a low-noise transformer of the present invention, the visible light normal reflectivity R of the magnesium silicate bottom layer is 45-55.3%.

Further, in the oriented silicon steel product with low iron loss for a low-noise transformer of the present invention, R has a statistical distribution σ in 100 mm$^2$ of the magnesium silicate bottom layer of 7.5 or less.

The present inventors have also found through researches that the magnetostriction of a silicon steel substrate is extremely sensitive to the evenness of the luster of the magnesium silicate bottom layer. This is mainly because the number of 90° magnetic domains inside the silicon steel substrate is affected by the magnesium silicate bottom layer. For example, a over-thin magnesium silicate layer, bright spots in the magnesium silicate layer, unevenness of the magnesium silicate bottom layer or other defects may result in uneven internal energy distribution in the crystal of the silicon steel substrate, resulting in an increase in the number of 90° magnetic domains in a part of the inner region (for example, a non-uniform region), thereby causing an increase in magnetostriction of the silicon steel substrate, resulting in a larger noise.

Therefore, in the present technical solutions, the uniformity of the magnesium silicate bottom layer is evaluated by the statistical distribution σ of the visible light normal reflectivity R within 100 mm$^2$ of the magnesium silicate bottom layer. In the technical solutions of the present invention, a is defined as a statistical standard deviation of the visible light normal reflectivity R measured in not less than 10 measurement points in 100 mm$^2$ of the magnesium silicate bottom layer continuously. The smaller the σ value, the smaller the difference of the visible light normal reflectivity R between the measurement points, that is, the higher the uniformity of the obtained magnesium silicate bottom layer, and thus the lower the magnetostriction of the obtained silicon steel product, and the lower the noise.

It should be noted that σ is closely related to the thickness, pinning structure, surface defects and surface roughness of the magnesium silicate bottom layer. The σ value reflects the uniformity of the magnesium silicate bottom layer, and directly affects the symmetry and smoothness of the magnetostriction waveform.

In order to achieve a better implementation effect, preferably, in the oriented silicon steel product with low iron loss for a low-noise transformer of the present invention, the statistical distribution σ of R in 100 mm² of the magnesium silicate bottom layer is 4 or less.

In the oriented silicon steel product with low iron loss for a low-noise transformer of the present invention, when a is 7.5 or less, the vibration noise caused by magnetostriction of the silicon steel substrate is decreased by 1~2 dBA; when σ is 4 or less, the vibration noise caused by the magnetostriction of the silicon steel substrate can be further reduced by 3~4 dBA.

Further, in the oriented silicon steel product with low iron loss for a low-noise transformer of the present invention, the magnesium silicate bottom layer has a thickness of 0.5~3 μm. This is because, in the technical solutions of the present invention, when the thickness of the magnesium silicate bottom layer is less than 0.5 μm, the energy distribution inside the grain is not uniform on the one hand, and the effective tension is not formed on the silicon steel substrate on the other hand; when the thickness of the magnesium silicate bottom layer is more than 3 μm, the pinning effect for the movement of the magnetic domain wall significantly increases, which increases the iron loss and reduces the magnetic induction.

Further, in the oriented silicon steel product with low iron loss for a low-noise transformer of the present invention, the magnesium silicate bottom layer has a surface roughness $R_a$ of 0.13~0.48 μm.

Further, in the oriented silicon steel product with low iron loss for a low-noise transformer of the present invention, the silicon steel substrate comprises Sn in a mass percentage of 0.01~0.20%.

The present invention uses the alloying element Sn to increase the inhibitory ability of the inhibitor, wherein the mechanism is as follows: Sn segregates at the interface between the MnS particle and the substrate, which reduces the interfacial energy of the precipitate, thereby inhibiting the Ostwald growing of the precipitate and maintaining a strong inhibition. Also, the segregation of Sn makes the primary crystal grains after decarburization annealing finer and more uniform, the pole-density of {110}, {211}, {111} increase, the pole-density of {100} decrease, the number of secondary crystal nuclei increase, the secondary recrystallization temperature decrease, and the secondary grain size smaller. In the oriented silicon steel product with low iron loss for a low-noise transformer of the present invention, when the mass percentage of Sn is less than 0.01%, the influence of the segregation of Sn on the inhibitor and the primary grain structure is too small to effectively reduce the secondary recrystallized structure with a reduced grain size, which is disadvantageous for reducing iron loss and magnetostriction. When the mass percentage of Sn is more than 0.20%, a large amount of Sn elements are segregated around the inhibitor particles, making the grain boundaries of Goss grains difficult to migrate, resulting in imperfect secondary recrystallization, reduced magnetic induction, and increased iron loss.

Further, in the oriented silicon steel product with low iron loss for a low-noise transformer of the present invention, the silicon steel substrate comprises the following chemical elements by mass percentages:

C: 0.035~0.120%, Si: 2.5~4.5%, Mn: 0.05~0.20%, S: 0.005~0.012%, Als: 0.015~0.035%, N: 0.004~0.009%, Cu: 0.01~0.29%, Sn: 0.01~0.20%, Nb: 0.05~0.10%, the balance is Fe and other unavoidable impurities.

The design principle of each chemical element in the oriented silicon steel product with low iron loss for a low-noise transformer of the present invention is as follows:

C: Carbon maintains the γ phase of the silicon steel during the normalizing of hot-rolled, and then a large amount of fine AlN precipitates can be obtained during rapid cooling since the solid solubility of nitrogen in the γ phase is much higher than that in the σ phase. The pinning dislocation during cold rolling can maintain a high dislocation density, so that the recrystallization nucleation position increases during annealing, and the primary crystal grains are fine and uniform, thereby promoting secondary recrystallization, and obtaining a silicon steel product having excellent magnetic properties. When the mass percentage of C is less than 0.035%, the γ phase formed during normalization is insufficient, which is disadvantageous for forming a perfect secondary recrystallized structure, resulting in deterioration of magnetic properties. When the mass percentage of C is more than 0.120%, decarburization is difficult in the subsequent annealing process, the magnetic aging phenomenon occurs in the finished product, the precipitation of MnS is difficult, and the inhibition ability thereof is low. Therefore, the present invention controls the mass percentage of carbon to 0.035~0.120% based on experiments.

Si: Silicon is a non-conductive element. Increasing the Si content in the steel reduces the eddy current generated inside the silicon steel product due to magnetic conduction, thereby reducing the loss of the silicon steel product. However, when the mass percentage of Si is too high, the amount of γ phase in the hot-rolled sheet during normalization is reduced, and the amount of precipitated inhibitor is reduced, which makes the secondary recrystallization of the silicon steel product difficult, and the magnetic properties of the finished product reduce. Therefore, the present invention defines a mass percentage of Si of 2.5~4.5% based on experiments.

Mn: MnS is one of the important inhibitors of the oriented silicon steel product with low iron loss for a low-noise transformer of the present invention. The solubility product of the mass percentage of Mn and S has various influence on secondary recrystallization and magnetism. When the mass percentage of Mn is less than 0.05%, the MnS inhibitor precipitated after hot rolling is insufficient, resulting in imperfect secondary recrystallization. When the mass percentage of Mn is higher than 0.20%, the size of the MnS inhibitor precipitation phase is too large and exceeds the critical value, resulting in weak pinning inhibition, which is also disadvantageous for secondary recrystallization, resulting in poor magnetic properties of the finished product. In view of this, the present invention defines the mass percentage of Mn to 0.05~0.20%.

S: In oriented silicon steel products, S combines with Mn to form an MnS inhibitor. In an oriented silicon steel, optimization of secondary recrystallized structure requires contents of S and Mn matching each other. Since the solid solubility of S in the σ phase is higher than that in the γ phase, an overhigh S content makes the desulfurization difficult in the subsequent high-temperature annealing, resulting in a magnetic aging phenomenon caused by an excessive S content in the finished product. The present invention determines that the optimal S content is 0.005~0.012% based on experiments.

Als: Als, which represents acid-soluble aluminum in silicon steel, is a key element in the formation of AlN inhibitors, and has the most obvious effect on magnetic properties. When the mass percentage of Als is less than 0.015%, the formed AlN inhibitor is insufficient, resulting in incomplete secondary recrystallization, and a silicon steel product having good magnetic properties cannot be obtained. When the mass percentage of Als is higher than 0.035%, on the one hand, the size of formed AlN inhibitor is too large and the inhibition ability thereof is weakened, and on the other hand, the quality of the magnesium silicate bottom layer is deteriorated. Therefore, the present invention defines the mass percentage of Als to 0.0150~0.035%.

N: AlN is one of the important inhibitors of the oriented silicon steel product with low iron loss for a low-noise transformer of the present invention. The relatively dispersed fine AlN inhibitor formed after hot rolling and normalizing is most advantageous for secondary recrystallization. Therefore, when the mass percentage of N is less than 0.004%, the amount of the AlN inhibitor formed after the normalizing is insufficient, resulting in a weak inhibition ability and incomplete secondary recrystallization of the product; when the mass percentage of N is more than 0.009%, the size of AlN inhibitor is too large, and on the other hand, the magnesium silicate bottom layer has many defects. Meanwhile, in order to suppress the severe precipitation of the AlN inhibitor along with the grain boundary due to the decrease of the γ phase in the late stage of hot rolling, in the technical solutions of the present invention, the mass percentage of N is controlled to 0.004~0.009%.

Cu: Cu can enlarge the γ phase region, which is beneficial to a stable Als content in steel during hot rolling since Als has higher solid solubility in γ phase. Moreover, the addition of Cu can reduce the enriched concentration of Sn on the near surface during the decarburization annealing process, which is favorable for forming a uniform bottom layer and reducing the noise of the oriented silicon steel product. However, Cu of a mass percentage more than 0.29% may reduce the decarburization efficiency during decarburization annealing. Therefore, in the oriented silicon steel product with low iron loss for a low-noise transformer of the present invention, the mass percentage of Cu is controlled to 0.01~0.29%.

Nb: Nb forms NbN in steel as an auxiliary inhibitor. Since NbN has a high decomposition temperature (about 1030° C.), it is advantageous to form perfect secondary recrystallization in the late stage of high temperature annealing. However, Nb tends to segregate on the precipitation phases of AlN and MnS, causing these precipitates to grow. Therefore, the content of Nb should not be too high. In view of this, the present invention defines the mass percentage of Nb to 0.05~0.10%.

Further, the oriented silicon steel product with low iron loss for a low-noise transformer of the present invention has a thickness of 0.30 mm or less and an iron loss of 1.02 W/Kg or less.

Accordingly, another object of the present invention is to provide a manufacturing method for the oriented silicon steel product with low iron loss for a low-noise transformer. The silicon steel product obtained by the above manufacture method has less iron loss, less magnetostriction, and low noise.

Based on the above object, the present invention provides a manufacturing method for the above oriented silicon steel product with low iron loss for a low-noise transformer, comprising the following steps in turn:

(1) smelting and casting;
(2) hot rolling;
(3) normalizing;
(4) cold rolling;
(5) decarburization annealing to reduce the carbon content in the silicon steel substrate to 30 ppm or less and the oxygen content to 2.0 g/m² or less; a nitriding treatment is performed before, after or simultaneously with the decarburization annealing to control the nitrogen content in the silicon steel substrate to 150~350 ppm; wherein, in the heating stage, there is a rapid heating stage in which the initial temperature is 600° C. or less, the final temperature is 700° C. or more, and the heating rate is 80° C./s or more; in addition, the difference between oxidation potentials of decarburization annealing protective atmosphere in the heating section stage and oxidation potentials in the holding section stage of decarburization annealing protective atmosphere satisfies the following formula:

$$\left(\frac{P_{H_2O}}{P_{H_2}}\right)_{Holding} - \left(\frac{P_{H_2O}}{P_{H_2}}\right)_{Heating} = A \cdot \frac{\log_{10}(V_h)}{100 \times [Sn]}$$

in the formula, A is the technological coefficient of oxidation potential; $P_{H_2O}$ and $P_{H_2}$ are partial pressures of $H_2O$ and $H_2$ in decarburization annealing protective atmosphere, respectively, in units of Pa; $V_h$ is the heating rate of rapid heating stage, in units of ° C./s; [Sn] is the content of Sn in the substrate, in units of %;

(6) high-temperature annealing: before the high-temperature annealing, the surface of the silicon steel substrate is coated with an annealing separator, wherein the annealing separator contains MgO;
(7) applying an insulation coating;
(8) laser scribing: scribing lines perpendicular to the rolling direction on the surface of the product is formed by a laser scribing, wherein parameters of the laser scribing satisfy the following formula:

$$0.4 \leq \frac{p \cdot a \cdot \exp\left(-\frac{R}{\lambda_0}\right)}{d} \leq 2$$

in the formula, p is the energy density of the incident laser, in units of mJ/mm²; a is the length of the focused spot of laser in rolling direction, in units of mm; R is the visible light normal reflectivity of magnesium silicate bottom layer, in units of %; d is the spacing of scribing lines in rolling direction, in units of mm; $\lambda_0$ is the wavelength of incident laser, in units of nm.

In the manufacturing method for the oriented silicon steel product with low iron loss for a low-noise transformer of the present invention, the step (5) of the decarburization annealing process is controlled for the following reasons: Sn element has a remarkable interfacial segregation effect. During decarburization annealing, this segregation affects the outward diffusion of Si element and the inward diffusion of O element in the silicon steel substrate, resulting in a less $SiO_2$ component in the oxide film of the decarburization annealed silicon steel substrate in the step (5), and thus a less the magnesium silicate content after the high-temperature annealing in the step (6). This tends to cause the magnesium silicate bottom layer to be thin and uneven in luster, which in turn causes a decrease in tension, and adversely affect the further refining of the magnetic domain. Through detailed research and extensive data analysis, the present inventors have found that by making the oxidation potential difference between the heating stage and the holding stage, the heating rate, and the Sn element content in the decarburization annealing process satisfy the formula described in step (5), a good magnesium silicate bottom layer can be formed, and the iron loss of the silicon steel sheet can be reduced. The controlling of the nitrogen content in the silicon steel substrate by nitriding treatment is aim to control the amount of inhibitor formed, and suppress the severe precipitation of the AlN inhibitor along with the grain boundary due to the decrease of the γ phase in the late hot rolling. In addition, it should be noted that, except for the rapid heating stage, heating uses conventional processes and will not be described in details.

Further, it should be noted that, in step (7) of the manufacturing method of the present invention, in some embodiments, surface treatment is performed before applying an insulation coating, for example, cleaning the residual magnesium oxide on the surface.

Further, in step (8) of the manufacturing method of the present invention, the laser scribing is for introducing micro stress regions on the partial surface of the silicon steel substrate to refine the magnetic domains. After the refinement, the average width of the magnetic domains is reduced, and the abnormal eddy current loss and magnetostriction are reduced. However, the micro stress regions increase the number of 90° domains. When the number of 90° magnetic domains is increased to a certain amount, the effect of the reduction of the magnetic domain width is counteracted, and the vibration noise generated by the magnetostriction of the silicon steel sheet is increased.

In addition, the inventors of the present invention have also found that, to reduce the iron loss and the magnetostrictive vibration noise of silicon steel substrate by refining the magnetic domain using laser scribing, the energy density of the incident laser and the visible light normal reflectivity R (visible light normal reflectivity of the magnesium silicate bottom layer) must be precisely matched to obtain a silicon steel sheet with significantly reduced vibration noise.

Therefore, taking various influencing factors into account and comprehensively considering a large amount of experimental data, the inventor of the present invention proposes a method in which the laser scribing is used to form scribing lines perpendicular to the rolling direction on the surface of the product, thereby obtaining the oriented silicon steel product with low iron loss for a low-noise transformer of the present invention, wherein parameters of the laser scribing satisfy the following formula:

$$0.4 \leq \frac{p \cdot a \cdot \exp\left(-\frac{R}{\lambda_0}\right)}{d} \leq 2.0$$

The magnetostriction of silicon steel substrates is extremely sensitive to various defects. Therefore, the value obtained by substituting the parameters of laser scribing into the formula needs to be controlled between 0.4 and 2.0. When the obtained value exceeds 2.0, the effective laser energy input to the silicon steel substrate is too large, which significantly increases the defects in the local region and increases the vibration noise of the silicon steel substrate. When the obtained value is less than 0.4, the effective laser energy input to the silicon steel substrate is too small to provide an effective magnetic domain refining effect, and thus the iron loss of the silicon steel substrate cannot be effectively reduced, also increasing magnetostrictive vibration noise.

It should be noted that, in step (8), p is the energy density of the incident laser, and the calculation formula of p is:

$$p = \frac{4 \cdot P \cdot t_{dwell}}{\pi \cdot a \cdot b}$$

in the formula, p is the energy density of incident laser, in units of $mJ/mm^2$; P is the output power of laser, in units of W; $t_{dwell}$ is the residence time of laser on the surface of the product, representing the laser irradiation time of a single point on silicon steel substrate, in units of ms; π is the pi; a is the length of the focused spot of laser in rolling direction, in units of mm; b is the lateral width of the focused spot of laser, in units of mm.

The above residence time $t_{dwell}$ can be calculated by: $t_{dwell}=b/V_S$, wherein, $V_S$ is the laser scanning speed, b is the lateral width of the focused spot of the laser.

Further, in the manufacturing method of the present invention, the technological coefficient A of oxidation potential ranges from 0.08 to 1.6.

In order to obtain a better implementation effect, in the manufacturing method of the present invention, the range of the technological coefficient A of oxidation potential is further defined for the following reasons: when A is less than 0.08, the visible light normal reflectivity R of magnesium silicate bottom layer tends to be more than 60% due to the following reasons: the oxidation potential in the heating stage of the decarburization annealing is too high, resulting in an excessive amount of FeO in the formed oxide film, and the amount of $Fe_2SiO_4$ which catalyzes the MgO in the annealing separant is insufficient, resulting in low reactivity of the oxide film. Therefore, the magnesium silicate bottom layer formed during the subsequent high-temperature annealing is thin. Moreover, in the late stage of high-temperature annealing, FeO is reduced to Fe in a reducing atmosphere, resulting in the easy formation of defects in the magnesium silicate bottom layer, which is manifested by a visible light normal reflectivity R of the magnesium silicate bottom layer of more than 60%. Thus, the tension of the magnesium silicate bottom layer is insufficient, and an oriented silicon steel sheet having low iron loss and low magnetostriction cannot be obtained. When the value of A is more than 1.6, the amount of oxygen adsorbed on the surface of the cold-rolled silicon steel is small, the diffusion of oxygen into the silicon steel sheet is insufficient, and the Sn element is segregated near the grain boundary in the near surface, which makes it difficult to combine Si and O, and thus the magnesium silicate bottom layer is not uniform. The tension applied by the uneven magnesium silicate bottom layer to the silicon steel substrate varies from region to region, so that a large number of 90° domains are generated, which increases the noise of the silicon steel sheet caused by magnetostriction.

Further, in the manufacturing method of the present invention, the energy density p of the incident laser is 50~200 $mJ/mm^2$. When the energy density p of the incident laser is more than 200 $mJ/mm^2$, a large stress region is formed in the thickness direction of the silicon steel substrate due to the thermal effects of laser, and the number of 90° magnetic domains rapidly increases, and the amount of magnetostriction increase. When the energy density p of the incident laser is less than 50 $mJ/mm^2$, an effective magnetic domain refining effect cannot be produced because the thermal stress region is too small.

Further, in the manufacturing method of the present invention, the length a of the focused spot of laser in rolling direction is 0.08 mm or less. In order to optimize the beneficial effect of magnetic domain refinement caused by laser scribing, the length a of the focused spot of laser in rolling direction is defined to be 0.08 mm or less. When the length a of the focused spot of laser in rolling direction is more than 0.08 mm, the length affected by the laser scribing exceeds 0.12 mm due to the thermal diffusion effect, and the formed thermal stress region is too large to reduce the iron loss of the silicon steel substrate.

Further, in the manufacturing method of the present invention, in step (8), the residence time of laser on the surface of the product is no more than 0.005 ms. The residence time is closely related to the thermal diffusion effect. Therefore, when the residence time is more than 0.005 ms, the laser energy will affect a large region through thermal diffusion, and the iron loss and magnetostriction of the silicon steel substrate cannot be reduced, which affects the effect of noise reduction. Therefore, in the manufacturing method of the present invention, the residence time of laser on the surface of the product is controlled to be no more than 0.005 ms.

Further, in the manufacturing method of the present invention, in step (6), the temperature during high-temperature annealing is 1150~1250° C., and the holding time is 15 hr or more.

It should be noted that, the manufacturing method of the present invention reduces the iron loss-caused noise by controlling the visible light normal reflectivity R of the magnesium silicate bottom layer and laser scribing, thereby obtaining the oriented silicon steel product with low iron loss for a low-noise transformer. Therefore, the heating temperature of the silicon steel substrate is not particularly limited. The slab can be heated to 1400° C. or more by using high temperature process and then rolling, or heated to 1250~1300° C. by using medium temperature process and then rolling, or heated to 1100~1250° C. by using low temperature process and then rolling.

In addition, in step (3) of the manufacturing method of the present invention, it is preferable to use a two-stage normalizing: in the first stage, the normalizing temperature is 1050~1180° C., and the normalizing time is 1~20 s; in the second stage, the normalizing temperature is 850~950° C., and the normalizing time is 30~200 s. After normalizing, cooling is carried out at a cooling rate of 10~60° C./s.

Further, in step (4), the cold rolling may be a single cold reduction, or a double cold reduction with intermediate annealing, and the total cold rolling reduction ratio is 80% or more.

In order to obtain a better effect of the invention, preferably, in the manufacturing method according to the present invention, in step (2), the slab is heated to 1090~1200° C. in a heating furnace, and then rolled.

In the oriented silicon steel product with low iron loss for a low-noise transformer and manufacturing method thereof of the present invention, by controlling the visible light normal reflectivity of the magnesium silicate bottom layer to obtain a uniform glossiness, various adverse effects of magnetostriction on the magnesium silicate bottom layer are overcome, the iron loss and the magnetostriction are reduced, and the noise of the obtained silicon steel product is reduced.

In the oriented silicon steel product with low iron loss for a low-noise transformer and manufacturing method thereof of the present invention, the visible light normal reflectivity of the magnesium silicate bottom layer for the visible light is precisely matched with the laser scribing in the process, so that the silicon steel product of the present invention is suitable for various production processes, and the obtained silicon steel product has low iron loss and low noise.

DETAILED DESCRIPTION

The oriented silicon steel product with low iron loss for a low-noise transformer and manufacturing method thereof of the present invention will be further explained and illustrated below concerning the accompanying drawings and specific Examples. However, the explanations and illustrations do not unduly limit the technical solutions of the present invention.

Examples A1-A9 and Comparative Examples B1-B8 were prepared by the following steps:

(1) smelting and casting according to formula of chemical components listed in Table 1;

(2) hot rolling: the slab was heated to 1090~1200° C. in a heating furnace, and then rolled to a thickness of 2.3 mm;

(3) normalizing: two-stage normalizing were used: in the first stage, the normalizing temperature was 1050~1180° C., and the normalizing time was 1~20 s; in the second stage, the normalizing temperature was 850~950° C., and the normalizing time was 30~200 s; then cooling was carried out at a cooling rate of 10~60° C./s.

(4) cold rolling: the steel sheet was rolled to a final thickness of 0.27 mm with a total cold rolling reduction ratio of 88.3% by a single cold reduction;

(5) decarburization annealing was performed to reduce the carbon content in the silicon steel substrate to 30 ppm or less and the oxygen content to 2.0 g/m$^2$ or less; a nitriding treatment was performed before, after or simultaneously with the decarburization annealing to control the nitrogen content in the silicon steel substrate to 150~350 ppm; wherein, in the heating stage, there was a rapid heating stage in which the initial temperature was 600° C. or less, the final temperature was 700° C. or more, and the heating rate was 80° C./s or more; specific process parameters of the heating stage are shown in Table 2-2; in addition, the difference between oxidation potentials of decarburization annealing protective atmosphere in the heating section stage and oxidation potentials in the holding section stage of decarburization annealing protective atmosphere satisfies the following formula:

$$\left(\frac{P_{H_2O}}{P_{H_2}}\right)_{Holding} - \left(\frac{P_{H_2O}}{P_{H_2}}\right)_{Heating} = A \cdot \frac{\log_{10}(V_h)}{100 \times [Sn]}$$

in the formula, A is the technological coefficient of oxidation potential; $P_{H_2O}$ and $P_{H_2}$ are partial pressures of $H_2O$ and $H_2$ in decarburization annealing protective atmosphere, respectively, in units of Pa; $V_h$ is the heating rate of rapid heating stage, in units of °C./s; [Sn] is the content of Sn in the substrate, in units of %;

(6) high temperature annealing: the surface of the silicon steel substrate was coated with an annealing separator containing MgO; in the annealing, the holding temperature is 1150~1250° C. and the holding time is 15 hr or more; further, a mixed gas containing $H_2$ and $N_2$ as main components was used as a protective gas, wherein the ratio of $H_2$ is 25~100%, and the atmospheric dew point (D.P.) of the was below 0° C.;

(7) applying an insulation coating: after cleaning the residual magnesium oxide on the surface, an insulation coating was applied, and the silicon steel substrate was subjected to hot drawing-flattening annealing to obtain a preliminary silicon steel product;

(8) laser scribing: laser scribing was used to form scribing lines perpendicular to the rolling direction on the surface of the product, wherein parameters of the laser scribing satisfy the following formula:

$$0.4 \leq \frac{p \cdot a \cdot \exp\left(-\frac{R}{\lambda_0}\right)}{d} \leq 2.0$$

in the formula, p is the energy density of the incident laser, in units of mJ/mm²; a is the length of the focused spot of laser in rolling direction, in units of mm; R is the visible light normal reflectivity of magnesium silicate bottom layer, in units of %; d is the spacing of scribing lines in rolling direction, in units of mm; $\lambda_0$ is the wavelength of incident laser, in units of nm.

In addition, it should be noted that in step (8), the technological coefficient A of oxidation potential ranges from 0.08 to 1.6; the energy density p of the incident laser is 50~200 mJ/mm²; the length a of the focused spot of laser in rolling direction is 0.08 mm or less; the residence time of laser on the surface of the product is no more than 0.005 ms; the incident laser has a wavelength of 1066 nm, a laser scanning speed of 200~500 m/s, and a laser output power of 1000 W.

Table 1 lists the mass percentage of chemical elements in Examples A1-A9 and Comparative Examples B1-B8.

TABLE 1

(wt %, the balance is Fe and other inevitable impurity elements)

| Number | C | Si | Mn | S | N | Als | Cu | Sn | Nb |
|---|---|---|---|---|---|---|---|---|---|
| A1 | 0.054 | 3.26 | 0.12 | 0.009 | 0.006 | 0.028 | 0.12 | 0.12 | 0.05 |
| A2 | 0.035 | 3.2 | 0.11 | 0.008 | 0.008 | 0.024 | 0.11 | 0.12 | 0.10 |
| A3 | 0.12 | 3.35 | 0.1 | 0.007 | 0.009 | 0.019 | 0.11 | 0.12 | 0.08 |
| A4 | 0.065 | 2.5 | 0.13 | 0.009 | 0.006 | 0.031 | 0.11 | 0.12 | 0.07 |
| A5 | 0.062 | 4.5 | 0.15 | 0.01 | 0.007 | 0.034 | 0.11 | 0.12 | 0.06 |
| A6 | 0.068 | 3.35 | 0.18 | 0.007 | 0.007 | 0.023 | 0.01 | 0.08 | 0.10 |
| A7 | 0.071 | 3.15 | 0.14 | 0.009 | 0.008 | 0.018 | 0.29 | 0.08 | 0.09 |
| A8 | 0.062 | 3.18 | 0.2 | 0.011 | 0.009 | 0.022 | 0.11 | 0.01 | 0.06 |
| A9 | 0.065 | 3.21 | 0.12 | 0.009 | 0.008 | 0.03 | 0.11 | 0.2 | 0.06 |
| B1 | *0.122* | 3.22 | 0.12 | 0.009 | 0.007 | 0.028 | 0.12 | 0.12 | 0.08 |
| B2 | *0.014* | 3.08 | 0.11 | 0.009 | 0.006 | 0.029 | 0.14 | 0.11 | 0.07 |
| B3 | 0.056 | *4.7* | 0.11 | 0.007 | 0.007 | 0.026 | 0.11 | 0.1 | 0.06 |
| B4 | 0.048 | *2.46* | 0.11 | 0.009 | 0.006 | 0.025 | 0.15 | 0.12 | 0.09 |
| B5 | 0.061 | 3.29 | 0.11 | 0.009 | 0.006 | 0.028 | *0.009* | 0.15 | *0.11* |
| B6 | 0.069 | 3.31 | 0.11 | 0.009 | 0.007 | 0.025 | *0.3* | 0.15 | *0.04* |
| B7 | 0.065 | 3.09 | 0.13 | 0.008 | 0.006 | 0.026 | 0.1 | *0.009* | 0.08 |
| B8 | 0.069 | 3.12 | 0.12 | 0.009 | 0.006 | 0.031 | 0.1 | *0.21* | 0.06 |

Tables 2-1 and 2-2 lists the specific process parameters in the manufacturing method of Examples A1-A9 and Comparative Examples B1-B8. Table 2-1 lists the specific process parameters in steps (2), (3), (4), (6) and (8), and Table 2-2 lists the specific process parameters in step (5).

TABLE 2-1

| | Step (2) | Step (3) | | | | | Step (6) | | | Step (8) | | | | |
|---|---|---|---|---|---|---|---|---|---|---|---|---|---|---|
| | | Normalizing | Normalizing | Normalizing | Normalizing | | Holding | | | | | | | |
| No. | Heating temperature (° C.) | temperature in first stage (° C.) | time in first stage (s) | temperature in second stage (° C.) | time in second stage (s) | Cooling rate (° C./s) | temperature of anealing (° C.) | Holding time (hr) | Volume percent of $H_2$ (%) | D.P. (° C.) | R (%) | p (mJ/mm²) | a (mm) | Residence time (ms) | d (mm) | $V_s$ (m/s) |
| A1 | 1090 | 1050 | 1 | 850 | 30 | 10 | 1150 | 15 | 25 | −5 | 53 | 80 | 0.08 | 0.0025 | 5 | 200 |
| A2 | 1200 | 1180 | 20 | 950 | 200 | 60 | 1250 | 15 | 50 | −10 | 51 | 53 | 0.06 | 0.00125 | 4 | 400 |
| A3 | 1095 | 1130 | 15 | 870 | 150 | 20 | 1200 | 15 | 75 | −13.5 | 51 | 199 | 0.032 | 0.0025 | 6 | 200 |
| A4 | 1200 | 1120 | 12 | 860 | 160 | 40 | 1150 | 18 | 100 | −5 | 48 | 114 | 0.032 | 0.0014 | 8 | 350 |
| A5 | 1090 | 1090 | 15 | 920 | 120 | 50 | 1180 | 18 | 15 | −10 | 49 | 80 | 0.08 | 0.004 | 5 | 200 |
| A6 | 1090 | 1080 | 10 | 900 | 140 | 30 | 1180 | 20 | 50 | −13.5 | 54 | 53 | 0.06 | 0.002 | 4 | 400 |
| A7 | 1200 | 1150 | 16 | 920 | 80 | 20 | 1180 | 20 | 75 | −5 | 49 | 199 | 0.032 | 0.004 | 8 | 200 |
| A8 | 1090 | 1050 | 16 | 910 | 100 | 15 | 1180 | 20 | 100 | −10 | 58 | 80 | 0.032 | 0.0016 | 6 | 500 |
| A9 | 1090 | 1130 | 15 | 900 | 150 | 20 | 1180 | 20 | 100 | −13.5 | 43 | 80 | 0.08 | 0.005 | 5 | 200 |
| B1 | 1090 | 1050 | 1 | 850 | 30 | 10 | 1150 | 15 | 25 | −5 | 48 | 53 | 0.06 | 0.0025 | 4 | 400 |
| B2 | 1200 | 1180 | 10 | 950 | 200 | 60 | 1250 | 15 | 50 | −10 | 51 | 199 | 0.032 | 0.005 | 8 | 200 |

TABLE 2-1-continued

| | Step (2) | Step (3) | | | | | Step (6) | | | | Step (8) | | | | |
|---|---|---|---|---|---|---|---|---|---|---|---|---|---|---|---|
| No. | Heating temperature (°C.) | Normalizing temperature in first stage (°C.) | Normalizing time in first stage (s) | Normalizing temperature in second stage (°C.) | Normalizing time in second stage (s) | Cooling rate (°C./s) | temperature of anealing (°C.) | Holding time (hr) | Volume percent of $H_2$ (%) | D.P. (°C.) | R (%) | p (mJ/mm²) | a (mm) | Residence time (ms) | d (mm) | $V_s$ (m/s) |
| B3 | 1095 | 1130 | 15 | 870 | 150 | 20 | 1200 | 18 | 75 | −13.5 | 45 | 80 | 0.032 | 0.002 | 6 | 500 |
| B4 | 1200 | 1120 | 12 | 860 | 160 | 40 | 1150 | 18 | 100 | −5 | 54 | 80 | 0.08 | 0.005 | 5 | 200 |
| B5 | 1090 | 1090 | 15 | 920 | 120 | 50 | 1180 | 20 | 25 | −10 | 46 | 53 | 0.06 | 0.0025 | 4 | 400 |
| B6 | 1090 | 1080 | 10 | 900 | 140 | 30 | 1180 | 20 | 50 | −13.5 | 51 | 199 | 0.032 | 0.005 | 8 | 200 |
| B7 | 1200 | 1150 | 16 | 910 | 80 | 20 | 1180 | 20 | 75 | −5 | 53 | 80 | 0.032 | 0.002 | 6 | 500 |
| B8 | 1090 | 1050 | 16 | 900 | 100 | 15 | 1180 | 20 | 100 | −10 | 45 | 80 | 0.08 | 0.005 | 5 | 200 |

TABLE 2-2

| | Step(5) | | | | | | | | | | |
|---|---|---|---|---|---|---|---|---|---|---|---|
| No. | Initial temperature in rapid heating stage (°C.) | Final temperature in rapid heating stage (°C.) | Rapid heating rate $V_h$ (°C./s) | Holding temperature (°C.) | Holding time (s) | Carbon content (ppm) | Oxygen content (g/m²) | Nitrogen content during nitriding treatment (ppm) | Oxidation potential in heating stage | Oxidation potential in holding stage | A |
| A1 | 600 | 730 | 95 | 832 | 132 | 8 | 1.03 | 173 | 0.35 | 0.46 | 0.67 |
| A2 | 590 | 730 | 102 | 835 | 132 | 10 | 1.42 | 200 | 0.36 | 0.48 | 0.72 |
| A3 | 580 | 730 | 110 | 840 | 132 | 11 | 1.13 | 223 | 0.37 | 0.50 | 0.76 |
| A4 | 600 | 720 | 88 | 826 | 132 | 12 | 1.92 | 245 | 0.35 | 0.54 | 1.17 |
| A5 | 600 | 710 | 80 | 845 | 132 | 14 | 0.86 | 347 | 0.35 | 0.52 | 1.07 |
| A6 | 600 | 730 | 95 | 832 | 132 | 22 | 0.79 | 153 | 0.37 | 0.45 | 0.32 |
| A7 | 590 | 730 | 102 | 835 | 132 | 13 | 1.83 | 212 | 0.29 | 0.56 | 1.07 |
| A8 | 580 | 730 | 110 | 840 | 132 | 22 | 1.01 | 229 | 0.29 | 0.46 | 0.08 |
| A9 | 600 | 720 | 88 | 826 | 132 | 17 | 0.78 | 298 | 0.41 | 0.56 | 1.54 |
| B1 | 600 | 710 | 80 | 845 | 132 | 13 | 0.74 | 312 | 0.32 | 0.48 | 1.01 |
| B2 | 600 | 730 | 95 | 832 | 132 | 9 | 1.02 | 330 | 0.35 | 0.44 | 0.50 |
| B3 | 590 | 730 | 102 | 835 | 132 | 7 | 1.73 | 174 | 0.31 | 0.62 | 1.54 |
| B4 | 580 | 730 | 110 | 840 | 132 | 8 | 0.91 | 198 | 0.41 | 0.46 | 0.29 |
| B5 | 600 | 720 | 88 | 826 | 132 | 14 | 0.79 | 159 | 0.35 | 0.54 | 1.47 |
| B6 | 600 | 710 | 80 | 845 | 132 | 16 | 1.02 | 189 | 0.39 | 0.46 | 0.55 |
| B7 | 580 | 730 | 110 | 838 | 132 | 15 | 1.06 | 238 | 0.28 | 0.66 | 0.17 |
| B8 | 600 | 730 | 95 | 838 | 132 | 13 | 0.77 | 286 | 0.35 | 0.48 | 1.38 |

Wherein, it should be noted that the oxidation potential in heating stage refers to $$\left(\frac{P_{H_2O}}{P_{H_2}}\right)_{Heating},$$

and the oxidation potential in holding stage refers to $$\left(\frac{P_{H_2O}}{P_{H_2}}\right)_{Holding}.$$

The samples of oriented silicon steel products with low iron loss for a low-noise transformer of the above Examples A1-A9 and Comparative Examples B1-B8 were subjected to various tests: iron loss was measured using 500 mm*500 mm single sheet method; and AC magnetostrictive vibration noise was measured on a 100 mm*500 mm silicon steel sheet according to the method of IEC60076-10-1. The obtained performance parameters were listed in Table 3.

Table 3 lists oriented silicon steel products with low iron loss for a low-noise transformer of Examples A1-A9 and Comparative Examples B1-B8.

TABLE 3

| Number | P17/50 (W/kg) | AWV1.7 (dBA) |
|---|---|---|
| A1 | 0.823 | 56.5 |
| A2 | 0.865 | 57.3 |
| A3 | 0.873 | 57.8 |
| A4 | 0.869 | 58.1 |
| A5 | 0.885 | 56.9 |
| A6 | 0.882 | 56.1 |
| A7 | 0.873 | 58.1 |
| A8 | 0.888 | 57.1 |
| A9 | 0.871 | 57.9 |
| B1 | 0.961 | 59.5 |
| B2 | 1.006 | 60.1 |
| B3 | 1.008 | 59.4 |
| B4 | 0.972 | 61.4 |
| B5 | 0.978 | 62.2 |
| B6 | 0.979 | 60.3 |
| B7 | 1.023 | 60.5 |
| B8 | 1.001 | 61.1 |

It can be seen from Table 3 that the iron loss of silicon steel products of Examples A1-A9 is 1.02 W/kg or less, and the AC magnetostrictive vibration noise is lower than 58.1 dBA. On the other hand, since the chemical component ratios of Comparative Examples B1-B8 are outside the scope defined by the present invention, the overall performance of the iron loss and the AC magnetostrictive vibration noise thereof are inferior to the Examples of the present invention.

Further, in order to examine the influence of technological coefficient A of oxidation potential on magnetic properties, Examples A10-A14 and Comparative Examples B9-B11 were prepared by the following steps:

(1) smelting and casting according to the following chemical composition: Si: 3.25%, C: 0.070%, Mn: 0.12%, S: 0.008%, N: 0.008%, Als: 0.023%, Cu: 0.11%, Sn: 0.09%, Nb: 0.08%, the balance being Fe and other inevitable impurity elements;

(2) hot rolling: the slab was heated to 1150° C. in a heating furnace, and then rolled to a thickness of 2.3 mm;

(3) normalizing: two-stage normalizing were used: in the first stage, the normalizing temperature was 1120° C., and the normalizing time was 15 s; in the second stage, the normalizing temperature was 870° C., and the normalizing time was 150 s; then cooling was carried out at a cooling rate of 20° C./s.

(4) cold rolling: the steel sheet was rolled to a final thickness of 0.27 mm with a total cold rolling reduction ratio of 88.3% by single cold reduction;

(5) decarburization annealing was performed to reduce the carbon content in the silicon steel substrate to 30 ppm and the oxygen content to 2.0 g/m², a nitriding treatment was performed before, after or simultaneously with the decarburization annealing to control the nitrogen content in the silicon steel substrate to 200 ppm; wherein, in the heating stage, there was a rapid heating stage in which the initial temperature was 600° C. or less, the final temperature was 700° C. or more, and the heating rate was 80° C./s or more; temperature was heated to 845° C., then holding for 132s; in addition, the difference between oxidation potentials of decarburization annealing protective atmosphere in the heating section stage and oxidation potentials in the holding section stage of decarburization annealing protective atmosphere was controlled.

(6) high temperature annealing: after cleaning the residual magnesium oxide on the surface, the surface of the silicon steel substrate was coated with an annealing separator containing MgO; wherein, the annealing temperature was 1200° C. and the holding time was 20 hr; further, the atmosphere was a nitrogen-hydrogen mixture with a volume percentage of $H_2$ of 100% and an atmospheric dew point D.P. of −10° C.;

(7) applying an insulation coating: after cleaning, an insulation coating was applied, and the silicon steel substrate was subjected to hot drawing-flattening annealing to obtain a preliminary silicon steel product;

(8) laser scribing: after uncoiling, the steel sheet was cleaned, coated with an insulating coating, and annealed by hot-drawing-flattening; based on visible light normal reflectivity R and the statistical distribution σ thereof, scribing lines parallel to the rolling direction were formed on the surface by continuous laser scanning; wherein, parameters of the laser scribing are as follows: the energy density p of the incident laser is 141 mJ/mm², the residence time is 0.005 ms, the length a of the focused spot of laser in rolling direction is 0.045 mm, the spacing d of the scribing lines in rolling direction is 5.0 mm, the incident laser has a wavelength of 1066 nm, a laser scanning speed of 200 m/s, and a laser output power of 1000 W.

(9) sample testing: iron loss was measured using 500 mm*500 mm single sheet method; and AC magnetostrictive vibration noise was measured on a 100 mm*500 mm silicon steel sheet according to the method of IEC60076-10-1. The obtained performance parameters are listed in Table 4.

TABLE 4

| Number | Rapid heating rate $V_h$ (° C./s) | Oxidation potential in heating stage | Oxidation potential in holding stage | A | R (%) | σ | P17/50 (W/kg) | AWV1.7 (dBA) |
|---|---|---|---|---|---|---|---|---|
| A10 | 80 | 0.271 | 0.61 | 1.6 | 43.2 | 6.8 | 0.885 | 58.9 |
| A11 | 90 | 0.42 | 0.61 | 0.88 | 54.1 | 4.2 | 0.865 | 57.9 |
| A12 | 100 | 0.51 | 0.61 | 0.45 | 52.2 | 3.6 | 0.851 | 57.5 |
| A13 | 120 | 0.61 | 0.628 | 0.08 | 58.2 | 6.8 | 0.848 | 58.8 |
| A14 | 150 | 0.56 | 0.61 | 0.21 | 56.7 | 5.5 | 0.846 | 58.5 |
| B9 | _75_ | 0.53 | 0.61 | 0.38 | 55.8 | 5 | 0.904 | 61.2 |
| B10 | 100 | 0.32 | 0.68 | _1.62_ | 40.1 | _8.1_ | 0.928 | 60.1 |
| B11 | 100 | 0.595 | 0.61 | _0.07_ | _65.1_ | _7.6_ | 0.933 | 59.8 |

Wherein, it should be noted that the oxidation potential in heating stage refers to $$\left(\frac{P_{H_2O}}{P_{H_2}}\right)_{Heating},$$

and the oxidation potential in holding stage refers to $$\left(\frac{P_{H_2O}}{P_{H_2}}\right)_{Holding}.$$

It can be seen from Table 4 that the iron loss of silicon steel products of Examples A10-A14 is 1.02 W/kg or less, and the AC magnetostrictive vibration noise is 58.9 dBA or less. On the other hand, the heating rate of Comparative Example B9 is lower than the range defined by the present invention, so that the iron loss of Comparative Example B9 is large, and the AC magnetostrictive vibration noise value is high. Moreover, the process parameters of oxidation potential of Comparative Examples B10-B11 are outside the scope defined by the present invention. Therefore, the magnesium silicate bottom layer of Comparative Example B10-B11 has poor luster uniformity, a high σ value, and the iron loss and the AC magnetostrictive vibration noise thereof are not as good as those in the Examples.

Further, in order to examine the influence of visible light normal reflectivity R and the statistical distribution σ thereof and laser scribing on magnetic properties, Examples A15-A20 and Comparative Examples B12-B19 were prepared by the following steps:

(1) smelting and casting according to the following chemical composition: Si: 3.25%, C: 0.070%, Mn: 0.12%, S: 0.008%, N: 0.008%, Als: 0.023%, Cu: 0.11%, Sn: 0.09%, Nb: 0.10%, the balance being Fe and other inevitable impurity elements;

(2) hot rolling: the slab was heated to 1150° C. in a heating furnace, and then rolled to a thickness of 2.6 mm;

(3) normalizing: two-stage normalizing were used: in the first stage, the normalizing temperature was 1120° C., and the normalizing time was 15 s; in the second stage, the normalizing temperature was 870° C., and the normalizing time was 150s; then cooling was carried out at a cooling rate of 20° C./s.

(4) cold rolling: the steel sheet was rolled to a final thickness of 0.27 mm with a total cold rolling reduction ratio of 89.6% by double cold reduction with intermediate annealing;

(5) decarburization annealing were performed to reduce the carbon content in the silicon steel substrate to 30 ppm and the oxygen content to 2.0 g/m$^2$; a nitriding treatment was performed before, after or simultaneously with the decarburization annealing to control the nitrogen content in the silicon steel substrate to 190 ppm; wherein, in the heating stage, there was a rapid heating stage in which the initial temperature was 600° C. or less, the final temperature was 700° C. or more, and the heating rate was 100° C./s; temperature was heated to 845° C., then holding for 132 s; and parameters in this step satisfies the following formula:

$$\left(\frac{P_{H_2O}}{P_{H_2}}\right)_{Holding} - \left(\frac{P_{H_2O}}{P_{H_2}}\right)_{Heating} = A \cdot \frac{\log_{10}(V_h)}{100 \times [Sn]}$$

wherein, A is 0.54, $\left(\frac{P_{H_2O}}{P_{H_2}}\right)_{Heating}$ is 0.36, and $\left(\frac{P_{H_2O}}{P_{H_2}}\right)_{Holding}$ is 0.48.

(6) high temperature annealing: after cleaning the residual magnesium oxide on the surface, the surface of the silicon steel substrate was coated with an annealing separator containing MgO; wherein, the annealing temperature was 1200° C. and the holding time was 20 hr; further, the atmosphere was a nitrogen-hydrogen mixture with a volume percentage of H$_2$ of 100% and an atmospheric dew point (D.P.) of −10° C.;

(7) applying an insulation coating: after cleaning, an insulation coating was applied, and the silicon steel substrate was subjected to hot drawing-flattening annealing to obtain a preliminary silicon steel product;

(8) laser scribing: after uncoiling, the steel sheet was cleaned, coated with an insulating coating, and annealed by hot drawing-flattening; based on visible light normal reflectivity R and the statistical distribution σ thereof, scribing lines parallel to the rolling direction were formed on the surface by continuous laser scanning; wherein, the incident laser has a wavelength of 533 nm, a laser scanning speed of 400 m/s, and a laser output power of 1300 W.

(9) sample testing: iron loss was measured using 500 mm*500 mm single sheet method; and AC magnetostrictive vibration noise was measured on a 100 mm*500 mm silicon steel sheet according to the method of IEC60076-10-1. The obtained performance parameters are listed in Table 5.

TABLE 5

| No. | R (%) | σ | p (mJ/mm$^2$) | t$_{dwell}$ (ms) | a (mm) | b (mm) | d (mm) | p*a*exp(−R/λ$_0$)/d | P17/50 (W/kg) | AWV1.7T (dBA) |
|---|---|---|---|---|---|---|---|---|---|---|
| A15 | 41 | 3.1 | 52 | 0.005 | 0.08 | 2 | 9.5 | 0.40 | 0.875 | 58.9 |
| A16 | 48.3 | 3.8 | 103 | 0.0013 | 0.04 | 0.5 | 8 | 0.47 | 0.862 | 57.9 |
| A17 | 59 | 3 | 166 | 0.0013 | 0.025 | 0.5 | 4 | 0.93 | 0.873 | 59.1 |
| A18 | 59.7 | 3 | 197 | 0.005 | 0.021 | 2 | 2 | 1.85 | 0.856 | 57.4 |
| A19 | 46.5 | 4 | 52 | 0.005 | 0.08 | 2 | 4.5 | 0.84 | 0.861 | 58.4 |
| A20 | 52.1 | 7.4 | 197 | 0.0013 | 0.021 | 0.5 | 4.5 | 0.83 | 0.864 | 59.2 |
| B12 | 37.2 | 2.7 | 69 | 0.0013 | 0.06 | 0.5 | 5 | 0.77 | 0.899 | 63.1 |
| B13 | 61.2 | 3.2 | 138 | 0.005 | 0.03 | 2 | 4.5 | 0.82 | 0.912 | 62.6 |
| B14 | 42.2 | 7.6 | 103 | 0.0025 | 0.04 | 1 | 8 | 0.48 | 0.873 | 63.8 |
| B15 | 43.2 | 2.3 | 83 | 0.0055 | 0.05 | 2.2 | 5 | 0.76 | 0.918 | 63.9 |
| B16 | 48.2 | 2.3 | 49 | 0.0025 | 0.084 | 1 | 4 | 0.95 | 0.933 | 62.8 |
| B17 | 48.2 | 2.3 | 207 | 0.0025 | 0.02 | 1 | 2 | 1.89 | 0.953 | 65.3 |
| B18 | 42.3 | 2.3 | 69 | 0.0025 | 0.06 | 1 | 10 | 0.38 | 0.900 | 62.3 |
| B19 | 40.5 | 3.1 | 197 | 0.0025 | 0.021 | 1 | 1.9 | 2.02 | 0.930 | 61 |

As can be seen from Table 5, in Examples A15-A20, the visible light normal reflectivity R of the magnesium silicate bottom layer is 40~60%, and the statistical distribution σ thereof is 7.5 or less, indicating that the luster of the magnesium silicate bottom layer is uniform. On the other hand, in Comparative Examples B12 and B13, the visible light normal reflectivity R of the magnesium silicate bottom layer is outside the scope defined by the present invention. Therefore, the iron loss and AC magnetostrictive vibration noise thereof are not as good as those in the Examples. In addition, the statistical distribution σ of Comparative Example B14 is greater than 7.5, indicating that the luster of the magnesium silicate bottom layer is not uniform, thus affecting the iron loss and the AC magnetostrictive vibration noise thereof. In addition, in Comparative Example B15-B19, the process parameters of laser scribing are outside the scope defined by the present invention. Specifically, the residence time of laser on the surface of the product in Comparative Example B15 is more than 0.005 ms; the energy density p of the incident laser of Comparative Example B16-B17 was outside the range defined by the present invention. Therefore, the iron loss and AC magnetostrictive vibration noise thereof are not as good as those in the Examples. In Comparative Example B18-B19, the magnesium silicate bottom layer and the laser scribing lines cannot precisely match, that is, the corresponding value of the formula defined by the present invention is outside the range of 0.4~2.0. Therefore, the iron loss and AC magnetostrictive vibration noise thereof are not as good as those in the Examples.

Further, in order to examine the influence of laser scribing process on magnetic properties, Examples A21-A26 and Comparative Examples B20-B27 were prepared by the following steps:

(1) smelting and casting according to the following chemical composition: Si: 3.25%, C: 0.070%, Mn: 0.12%, S: 0.008%, N: 0.008%, Als: 0.023%, Cu: 0.11%, Sn: 0.09%, Nb: 0.07%, the balance being Fe and other inevitable impurity elements;

(2) hot rolling: the slab was heated to 1150° C. in a heating furnace, and then rolled to a thickness of 2.3 mm;

(3) normalizing: two-stage normalizing were used: in the first stage, the normalizing temperature was 1120° C., and the normalizing time was 15 s; in the second stage, the normalizing temperature was 870° C., and the normalizing time was 150 s; then cooling was carried out at a cooling rate of 20° C./s.

(4) cold rolling: the steel sheet was rolled to a final thickness of 0.23 mm with a total cold rolling reduction ratio of 90% by a single cold reduction;

(5) decarburization annealing was performed to reduce the carbon content in the silicon steel substrate to 30 ppm and the oxygen content to 2.0 g/m$^2$; a nitriding treatment was performed before, after or simultaneously with the decarburization annealing to control the nitrogen content in the silicon steel substrate to 180 ppm; wherein, in the heating stage, there was a rapid heating stage in which the initial temperature was 580° C., the final temperature was 720° C., and the heating rate was 102° C./s; temperature was heated to 845° C., then holding for 132 s; and parameters in this step satisfies the following formula:

$$\left(\frac{P_{H_2O}}{P_{H_2}}\right)_{Holding} - \left(\frac{P_{H_2O}}{P_{H_2}}\right)_{Heating} = A \cdot \frac{\log_{10}(V_h)}{100 \times [Sn]},$$

wherein, A is 0.54, $\left(\frac{P_{H_2O}}{P_{H_2}}\right)_{Heating}$ is 0.36, and $\left(\frac{P_{H_2O}}{P_{H_2}}\right)_{Holding}$ is 0.48.

(6) high temperature annealing: after cleaning the residual magnesium oxide on the surface, the surface of the silicon steel substrate was coated with an annealing separator containing MgO; wherein, the annealing temperature was 1200° C. and the holding time was 22 hr; further, the atmosphere was a nitrogen-hydrogen mixture with a volume percentage of H$_2$ of 100% and an atmospheric dew point D.P. of −10° C.;

(7) applying an insulation coating: after cleaning, an insulation coating was applied, and the silicon steel substrate was subjected to hot drawing-flattening annealing to obtain a preliminary silicon steel product;

(8) laser scribing: after uncoiling, the steel sheet was cleaned, applied with an insulating coating, and annealed by hot drawing-flattening; based on visible light normal reflectivity R and the statistical distribution σ thereof, scribing lines parallel to the rolling direction were formed on the surface by continuous laser scanning; wherein, the incident laser has a wavelength of 533 nm, a laser scanning speed of 350 m/s, and a laser output power of 1000 W.

(9) sample testing: iron loss was measured using 500 mm*500 mm single sheet method; and AC magnetostrictive vibration noise was measured on a 100 mm*500 mm silicon steel sheet according to the method of IEC60076-10-1. The obtained performance parameters are listed in Table 6.

TABLE 6

| No. | R (%) | σ | p (mJ/mm$^2$) | t$_{dwell}$ (ms) | a (mm) | b (mm) | d (mm) | p*a*exp (−R/λ$_0$)/d | P17/50 (W/kg) | AWV1.7T (dBA) |
| --- | --- | --- | --- | --- | --- | --- | --- | --- | --- | --- |
| A21 | 40.5 | 3.1 | 52 | 0.0029 | 0.07 | 1.0 | 8.5 | 0.40 | 0.795 | 56.6 |
| A22 | 46.2 | 2.5 | 91 | 0.0023 | 0.04 | 0.8 | 8 | 0.42 | 0.782 | 55.8 |
| A23 | 58.7 | 2.6 | 146 | 0.0017 | 0.025 | 0.6 | 4 | 0.81 | 0.793 | 57.9 |
| A24 | 59.5 | 2.8 | 173 | 0.0011 | 0.021 | 0.4 | 2 | 1.63 | 0.776 | 56.7 |
| A25 | 43.2 | 3.9 | 52 | 0.0029 | 0.07 | 1.0 | 4.5 | 0.75 | 0.781 | 58.2 |
| A26 | 55.2 | 7.4 | 173 | 0.0011 | 0.021 | 0.4 | 4.5 | 0.73 | 0.784 | 57.5 |
| B20 | *38.6* | 3.5 | 61 | 0.0029 | 0.06 | 1.0 | 5 | 0.68 | 0.819 | 61.6 |
| B21 | *62.1* | 3.2 | 121 | 0.0023 | 0.03 | 0.8 | 4.5 | 0.72 | 0.832 | 60.1 |
| B22 | 51.2 | 7.7 | 91 | 0.0017 | 0.04 | 0.6 | 8 | 0.41 | 0.793 | 59.2 |
| B23 | 45.3 | 2.5 | 73 | *0.0057* | 0.05 | 2.0 | 5 | 0.67 | 0.838 | 60.3 |
| B24 | 50.2 | 3.2 | *49* | 0.0029 | 0.075 | 1.0 | 4 | 0.83 | 0.853 | 61.2 |
| B25 | 52.2 | 2.6 | *202* | 0.0017 | 0.018 | 0.6 | 2 | 1.65 | 0.873 | 63.5 |
| B26 | 48.7 | 4.1 | 61 | 0.0013 | 0.06 | 0.45 | 10 | *0.33* | 0.82 | 60.6 |
| B27 | 40.1 | 4.1 | 173 | 0.0009 | 0.021 | 0.3 | 1.6 | *2.11* | 0.84 | 61.2 |

As can be seen from Table 6, in Examples A21-A26, the visible light normal reflectivity R of the magnesium silicate bottom layer is 40~60%, and the statistical distribution σ is 7.5 or less, indicating that the luster of the magnesium silicate bottom layer is uniform. On the other hand, in Comparative Examples B20 and B21, the visible light normal reflectivity R of the magnesium silicate bottom layer is outside the scope defined by the present invention. Therefore, the iron loss and AC magnetostrictive vibration noise thereof are not as good as those in the Examples. In addition, the statistical distribution σ of Comparative Example B22 is greater than 7.5, indicating that the luster of the magnesium silicate bottom layer is not uniform, thus affecting the iron loss and the AC magnetostrictive vibration noise thereof. In addition, in Comparative Example B23-B27, the process parameters of laser scribing are outside the scope defined by the present invention. Specifically, the residence time of laser on the surface of the product in Comparative Example B23 is more than 0.005 ms; the energy density p of the incident laser of Comparative Example B24-B25 was outside the range defined by the present invention. Therefore, the iron loss and AC magnetostrictive vibration noise thereof are not as good as those in the Examples. In Comparative Example B26-B27, the magnesium silicate bottom layer and the laser scribing lines cannot precisely match, that is, the corresponding value of the formula defined by the present invention is outside the range of 0.4~2.0. Therefore, the iron loss and AC magnetostrictive vibration noise thereof are not as good as those in the Examples.

Figure 1:
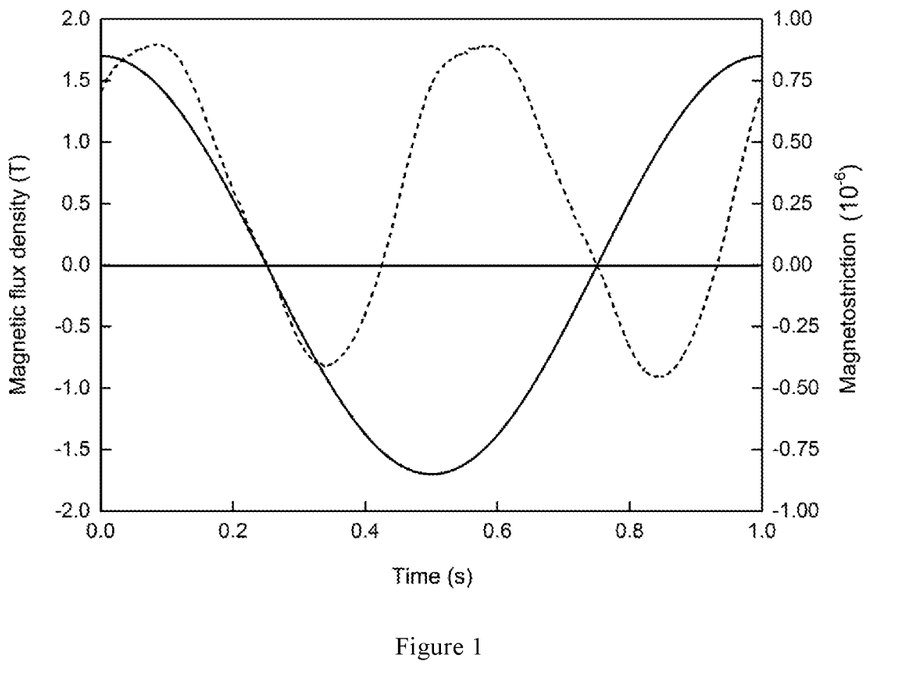
FIG. 1 is a time-domain diagram of magnetic flux density and magnetostriction of a silicon steel sheet in the prior art.

FIG. 1 is a time-domain diagram of magnetic flux density and magnetostriction of a silicon steel sheet in the prior art.

As shown in FIG. 1, the solid line indicates the magnetic flux density, and the broken line indicates the magnetostriction. During the magnetization process, the silicon steel sheet vibrates at a frequency that is twice of the frequency of the applied alternating excitation field. Meanwhile, due to the hysteresis effect, the vibration has obvious harmonic characteristics, as shown by the fact that the magnetostriction of the silicon steel sheet has vibration spectrum which is an integral multiple of the fundamental frequency. The basic quantities characterizing the magnitude of magnetostriction are λ0-p and λp-p. λ0-p is the difference between the maximum magnetostriction at the specified external field strength and the magnetostriction in the absence of external field (the silicon steel sheet is in a free state). λp-p represents the difference between the maximum and minimum values of magnetostriction of the silicon steel sheet at the specified external field strength.

The magnetostriction of silicon steel sheet defined by λ0-p and λp-p reflects the amplitude variation of the silicon steel sheet during AC magnetization process, but does not reflect information about the vibration frequency. The frequency of the vibration directly affects the magnitude of the noise. In order to comprehensively measure the vibration noise caused by the magnetostriction of silicon steel sheet, the AWV value at the specified magnetic field strength is used as an evaluation standard in IEC60076-10-1.

$$AWV = 20\log_{10}\frac{\rho c \sqrt{\sum_i \left[(2\pi f_i)\cdot(\lambda_i/\sqrt{2})\cdot\alpha_i\right]^2}}{P_{e0}} \quad (1)$$

wherein, AWV is the calculated value of vibration noise generated by magnetostriction of silicon steel sheet under A-weight; $\rho$ is air density; c is the speed of sound in air; $f_i$ is the harmonic frequency of magnetostriction i times; $\lambda_i$ is the harmonic amplitude of magnetostriction i times; $\alpha_i$ is the filtering weighting factor at frequency $f_i$; $P_{e0}$ is the reference minimum audible sound pressure, which is $2\times10^{-5}$ Pa.

AWV combines the amplitude and waveform of magnetostriction so as to more directly reflect the vibration and noise of silicon steel sheet. The magnetostriction waveform in FIG. 1 is converted into a frequency domain signal by Fourier transform, and the amplitude at each frequency is brought into the formula (1) to obtain the AWV value of the silicon steel sheet.

Figure 2:
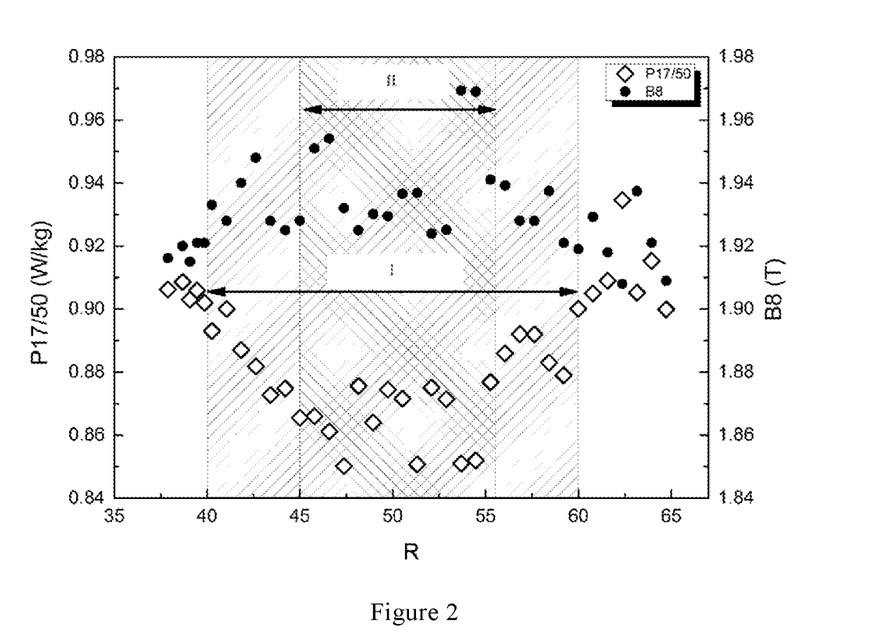
FIG. 2 is a schematic view showing curve distribution between the visible light normal reflectivity R and the iron loss/magnetic induction of the silicon steel product of the present invention.

FIG. 2 is a schematic view showing curve distribution between the visible light normal reflectivity R and the iron loss/magnetic induction of the silicon steel product of the present invention.

As shown in FIG. 2, the magnetic permeability of a silicon steel product is shown as magnetic induction, which is generally represented by B8, that is, the magnetic flux density of the silicon steel product under the excitation magnetic field of 800 A/m, and the dimension of B8 is T. The iron loss of a silicon steel product is generally represented by P17/50, that is, the ineffective electric energy consumed by the magnetization of the silicon steel product when the magnetic flux density in the steel strip reaches 1.7T under an alternating excitation field of 50 Hz, and the dimension of P17/50 is W/kg. In FIG. 2, I represents a range of R of 40~60% in the technical solutions of the present invention, and II represents a preferred range of R of 45~55.3%.

Figure 3:
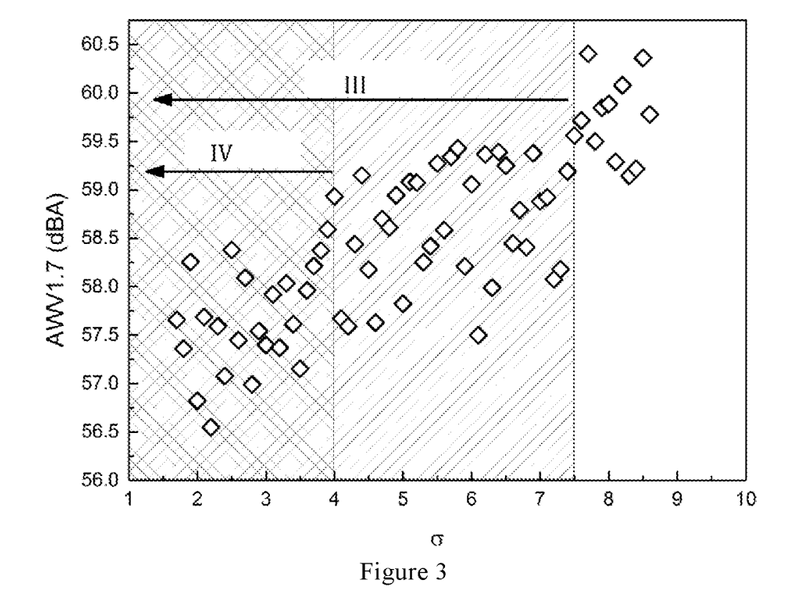
FIG. 3 is a schematic view showing curve distribution between the statistical distribution σ of visible light normal reflectivity R in 100 mm$^2$ of the magnesium silicate bottom layer and the vibration noise of the silicon steel product of the present invention.

FIG. 3 is a schematic view showing curve distribution between the statistical distribution σ of visible light normal reflectivity R in 100 mm$^2$ of the magnesium silicate bottom layer and the vibration noise of the silicon steel product of the present invention.

As shown in FIG. 3, III shows the distribution of vibration noise when the statistical distribution σ is 7.5 or less (within the technical solutions of the present invention). IV shows the distribution of vibration noise when the statistical distribution σ is 4 or less (within the preferred technical solutions of the present invention).

Figure 4:
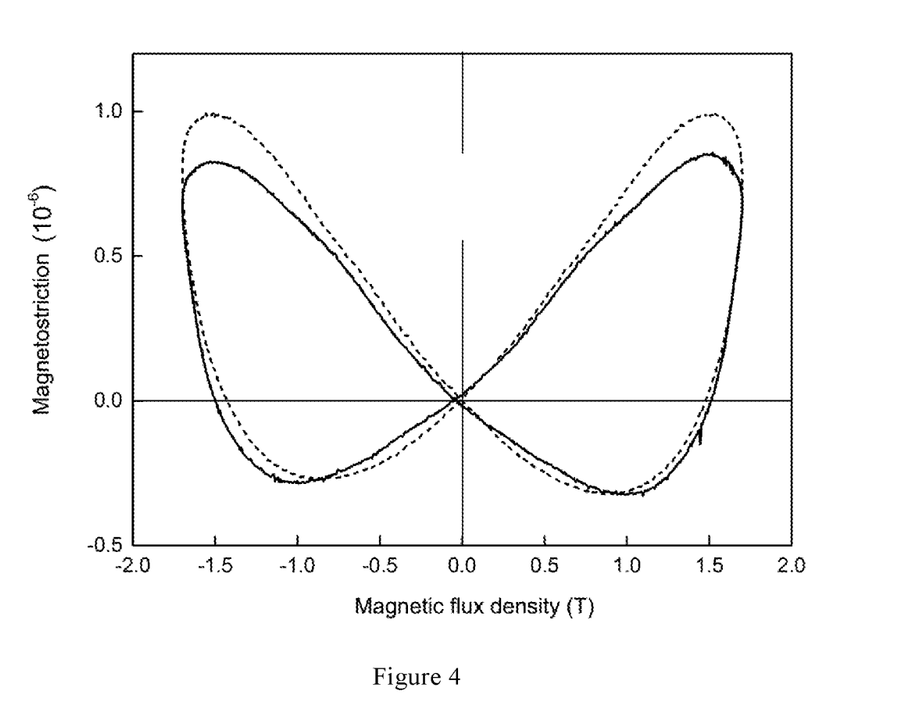
FIG. 4 is a schematic view showing curve between the statistical distribution σ of different visible light normal reflectivity R and magnetostriction waveform/vibration noise of the silicon steel product of the present invention.

FIG. 4 is a schematic view showing curve between the statistical distribution σ of different visible light normal reflectivity R and magnetostriction waveform/vibration noise of the silicon steel product of the present invention.

As shown in FIG. 4, the curve with a solid line indicates that the vibration noise is 58.94 dBA when σ is 7.9, and the curve with a broken line indicates that the vibration noise is 57.51 dBA when σ is 4.52.

Figure 5:
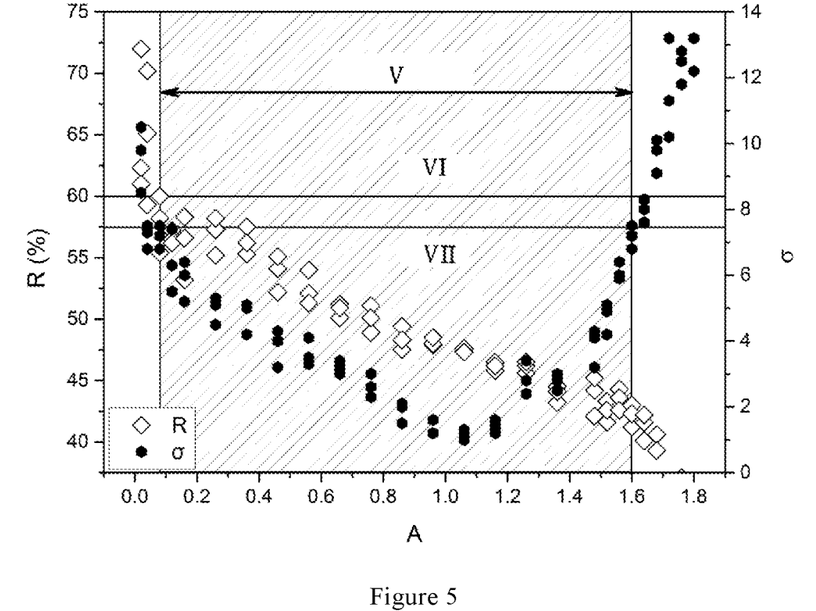
FIG. 5 is a schematic view showing curve distribution between the technological coefficient A of oxidation potential and the visible light normal reflectivity R/statistical distribution σ of the silicon steel product of the present invention.

FIG. 5 is a schematic view showing curve distribution between the technological coefficient A of oxidation potential and the visible light normal reflectivity R/statistical distribution σ of the silicon steel product of the present invention.

As shown in FIG. 5, V indicates that when the technological coefficient of oxidation potential is 0.08~1.6, a silicon steel product having a visible light normal reflectivity R in the range of 40~60% and a statistical distribution σ of 7.5 or less can be obtained, wherein, the straight line VI represents a visible light normal reflectivity R of 60%, and the straight line VII represents a statistical distribution σ of 7.5.

Figure 6:
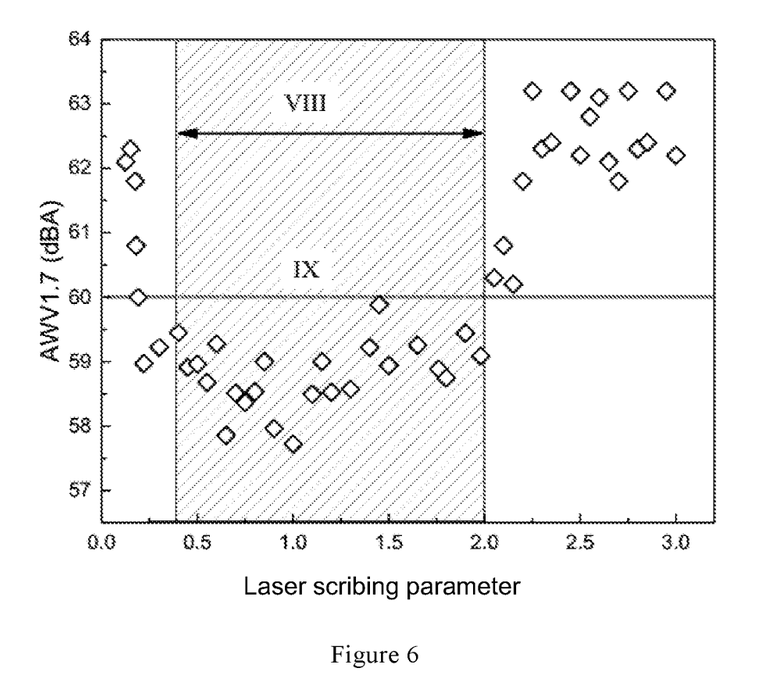
FIG. 6 is a schematic view showing curve distribution between the parameters of laser scribing and the vibration noise of the silicon steel product of the present invention.

FIG. 6 is a schematic view showing curve distribution between the parameters of laser scribing and the vibration noise of the silicon steel product of the present invention.

As shown in FIG. 6, parameters of laser scribing satisfy the following formula:

$$0.4 \le \frac{p\cdot a\cdot \exp\left(-\frac{R}{\lambda_0}\right)}{d} \le 2.0$$

in the formula, p is the energy density of the incident laser, in units of mJ/mm$^2$; a is the length of the focused spot of laser in rolling direction, in units of mm; R is the visible light normal reflectivity of magnesium silicate bottom layer, in units of %; d is the spacing of scribing lines in rolling direction, in units of mm; $\lambda_0$ is the wavelength of incident laser, in units of nm.

As can be seen from FIG. 6, VIII indicates that when the laser scribing parameter is in the range of 0.4~2, a silicon steel product having a vibration noise of less than 60 dBA can be obtained, wherein the straight line IX represents a vibration noise of 60 dBA.

It should be noted that the above are merely illustrative of specific Examples of the invention. It is obvious that the present invention is not limited to the above Examples, but has many similar variations. All modifications that are directly derived or associated by those skilled in the art on the basis of the present application are intended to be within the scope of the present invention.

The invention claimed is:

1. An oriented silicon steel product with low iron loss for a low-noise transformer, comprising a silicon steel substrate, a magnesium silicate bottom layer formed on a surface of the silicon steel substrate having a thickness of 0.5-3 µm, and an insulation coating applied on the magnesium silicate bottom layer, wherein the magnesium silicate bottom layer has a visible light normal reflectivity R of 40-60%;
   wherein R has a statistical distribution σ in 100 mm² of the magnesium silicate bottom layer of 7.5 or less; and
   wherein the silicon steel substrate consists of the following chemical elements by mass percentages:
   C: 0.035-0.120%, Si: 2.5-4.5%, Mn: 0.05-0.20%, S: 0.005-0.012%, acid-soluble Al: 0.015-0.035%, N: 0.004-0.009%, Cu: 0.01-0.29%, Sn: 0.08-0.20%, Nb: 0.05-0.10%, the balance being Fe and other unavoidable impurities.

2. The oriented silicon steel product with low iron loss for a low-noise transformer according to claim 1, wherein the magnesium silicate bottom layer has a visible light normal reflectivity R of 45-55.3%.

3. The oriented silicon steel product with low iron loss for a low-noise transformer according to claim 1, wherein the statistical distribution σ of R in 100 mm² of the magnesium silicate bottom layer is 4 or less.

4. The oriented silicon steel product with low iron loss for a low-noise transformer according to claim 1, wherein the magnesium silicate bottom layer has a surface roughness $R_a$ of 0.13-0.48 µm.

5. The oriented silicon steel product with low iron loss for a low-noise transformer according to claim 1, wherein the steel product has a thickness of 0.30 mm or less and an iron loss of 1.02 W/Kg or less.

6. A manufacturing method for the oriented silicon steel product with low iron loss for a low-noise transformer of claim 1, comprising the following steps in turn:
   (1) smelting and casting;
   (2) hot rolling;
   (3) normalizing;
   (4) cold rolling;
   (5) decarburization annealing to reduce the carbon content in the silicon steel substrate to 30 ppm or less and the oxygen content to 2.0 g/m² or less; a nitriding treatment is performed before, after or simultaneously with the decarburization annealing to control the nitrogen content in the silicon steel substrate to 150-350 ppm; wherein in the heating stage, there is a rapid heating stage in which the initial temperature is 600° C. or less, the final temperature is 700° C. or more, and the heating rate is 80° C./s or more; in addition, the difference between oxidation potentials in the heating stage and oxidation potentials in the holding stage of decarburization annealing protective atmosphere satisfies the following formula:

$$\left(\frac{P_{H_2O}}{P_{H_2}}\right)_{Holding} - \left(\frac{P_{H_2O}}{P_{H_2}}\right)_{Heating} = A \cdot \frac{\log_{10}(V_h)}{100 \times [Sn]}$$

in the formula, A is the technological coefficient of oxidation potential; $P_{H_2O}$ and $P_{H_2}$ are partial pressures of $H_2O$ and $H_2$ in decarburization annealing protective atmosphere, respectively, in units of Pa; $V_h$ is the heating rate of rapid heating stage, in units of ° C./s; [Sn] is the content of Sn in the substrate, in units of %;
   (6) high-temperature annealing: before the high-temperature annealing, the surface of the silicon steel substrate is coated with an annealing separator, wherein the annealing separator contains MgO;
   (7) applying an insulation coating;
   (8) laser scribing: scribing lines perpendicular to the rolling direction is formed on the surface of the product by laser scribing, wherein parameters of the laser scribing satisfy the following formula:

$$0.4 \leq \frac{p \cdot a \cdot \exp\left(-\frac{R}{\lambda_0}\right)}{d} \leq 2$$

in the formula, p is the energy density of the incident laser, in units of mJ/mm²; a is the length of the focused spot of laser in rolling direction, in units of mm; R is the visible light normal reflectivity of magnesium silicate bottom layer, in units of %; d is the spacing of scribing lines in rolling direction, in units of mm; $\lambda_0$ is the wavelength of incident laser, in units of nm.

7. The manufacturing method according to claim 6, wherein the technological coefficient A of oxidation potential ranges from 0.08 to 1.6.

8. The manufacturing method according to claim 6, wherein the energy density p of the incident laser is 50-200 mJ/mm².

9. The manufacturing method according to claim 6, wherein the length a of the focused spot of laser in rolling direction is 0.08 mm or less.

10. The manufacturing method according to claim 6, wherein in step (8), the residence time of laser on the surface of the product is no more than 0.005 ms.

11. The manufacturing method according to claim 6, wherein in step (6), the holding temperature of annealing is 1150-1250° C., and the holding time is 15 hr or more.

12. The manufacturing method according to claim 6, wherein in step (2), the slab is heated to 1090-1200° C. in a heating furnace, and then rolled.

* * * * *